(12) United States Patent
Kim et al.

(10) Patent No.: US 10,275,911 B2
(45) Date of Patent: Apr. 30, 2019

(54) DYNAMICALLY ADJUSTED SCALE LABELS FOR DISPLAYED CHART

(71) Applicant: salesforce.com, inc., San Francisco, CA (US)

(72) Inventors: Yuseung Kim, San Francisco, CA (US); Anwesha Samanta, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 251 days.

(21) Appl. No.: 15/198,874

(22) Filed: Jun. 30, 2016

(65) Prior Publication Data

US 2018/0005418 A1    Jan. 4, 2018

(51) Int. Cl.
*G06F 3/048*   (2013.01)
*G06T 11/20*   (2006.01)

(52) U.S. Cl.
CPC ........ *G06T 11/206* (2013.01); *G06T 2200/24* (2013.01)

(58) Field of Classification Search
CPC .................................................. H04N 7/0122
USPC ....................................................... 345/440
See application file for complete search history.

(56) References Cited

U.S. PATENT DOCUMENTS

2016/0307344 A1* 10/2016 Monnier ............... G06T 11/206

OTHER PUBLICATIONS http://www.fmsinc.com/microsoftaccess/controls/components/rotated-text/index.html, Sep. 1, 2009.*
CADLearning, AutoCAD 2011 Tutorial—Displaying the Coordinates of a Point, Jun 21, 2011, https://www.youtube.com/watch?v=EvnjncmZJyg.*

* cited by examiner

*Primary Examiner* — Matthew Ell
*Assistant Examiner* — Mohamed Abou El Seoud
(74) *Attorney, Agent, or Firm* — Sterne, Kessler, Goldstein & Fox P.L.L.C.

(57) ABSTRACT

System, method, and computer product embodiments for proving a chart with dynamically-adjusted scale labels are described. A graphical user interface (GUI) generates a chart to display a set of data within a display area. The chart includes a plurality of x-axis scale labels to indicate a scale on the x-axis of the chart. The GUI reduces a distance between adjacent x-axis scale labels from the plurality of x-axis scale labels, responsive to detecting a command that re-renders the chart and that reduces the distance between adjacent x-axis scale labels. When the GUI determines that the distance is within a threshold, the GUI increases the distance by rotating each x-axis scale label towards a vertical orientation. Then, the GUI displays the set of data and the plurality of rotated x-axis scale labels within the chart as re-rendered according to the command.

20 Claims, 11 Drawing Sheets

DYNAMICALLY ADJUSTED SCALE LABELS FOR DISPLAYED CHART

BACKGROUND

A graphical user interface (GUI) is commonly implemented within a software client to enable users to graphically view and manipulate data retrieved from a database system. The GUI can display a data set, received from the database system, in the form of a chart. The chart, such as a line chart, graphically represents the retrieved data. The chart also includes x-axis and y-axis scale labels that indicate a scale of the x-axis and y-axis, respectively. As the chart is resized, the GUI effectively "shrinks" the displayed data such that the same information is presented in less space.

When shrinking the chart, conventional GUIs reduces the scale by, for example, reducing the distance between the scale labels. When the chart is reduced to a certain size, however, the scale labels may start to overlap, which hinders a user's readability of displayed scale labels. To prevent scale labels from overlapping, other conventional GUIs reduce the font size of the scale labels to display each of the scale labels in less space. But, when the font is reduced below a certain size, users operating the GUI cannot easily read or interact with the graphed data. Moreover, when users zoom in and out of the chart to focus on different portions of displayed data, conventional scale labels to not adjust dynamically in an intelligent manner.

DETAILED DESCRIPTION

Provided herein are system, method, article of manufacture, or computer product embodiments, or combinations and sub-combinations thereof, for providing charts having dynamically adjusted reference scaling.

I. Example System Overview

Figure 1:
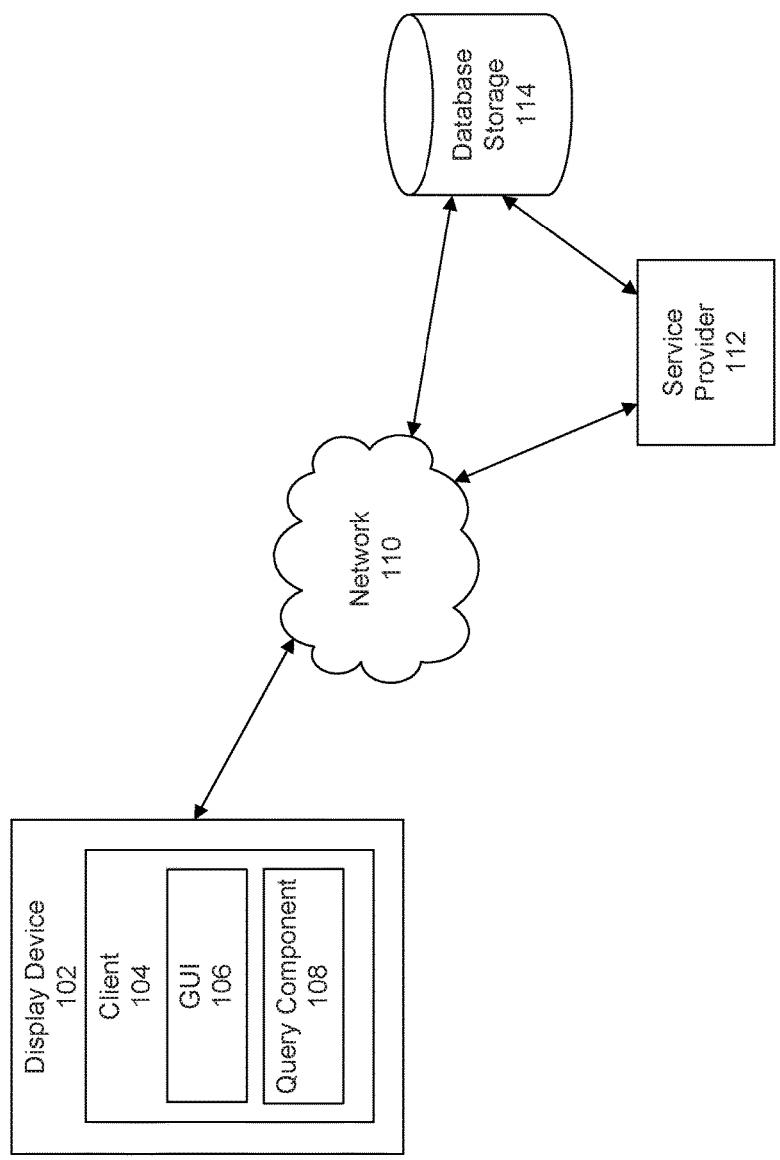
FIG. 1 shows an example system for providing a dynamically-adjusted chart according to some implementations.

FIG. 1 shows an example system 100 for providing a dynamically-adjusted chart, according to some implementations. System 100 includes display device 102 that communicates with service provider 112 or database storage 114 through network 110. Network 110 may be, for example, a LAN (Local Area network), MAN (metropolitan area network), WAN (Wide Area Network) such as the Internet, or any combination thereof. Network 110 may further utilize Ethernet communications, although other wired or wireless communication techniques, protocols, and technologies can be used.

In an embodiment, service provider 112 connects to database storage 114 to issue queries on data stored in database storage 114. Database storage 114 may be queried by, for example, display device 102. Queries can include one or more of the following types of statements: data definition language (DDL), data manipulation language (DML), data control language (DCL), transaction control (TCL), or any combination thereof. For example, a query received from display device 102 may be a DML statement to retrieve data from database storage 114 according to specified criteria. In an embodiment, service provider 112 includes a database management system to communicate with database storage 114. Service provider 112 may be implemented on one or more servers, which may operate in a distributed environment. Each of these servers may be software, suitable hardware, or a combination thereof that responds to other computers and devices in a network.

In an embodiment, database storage 114 is a relational database that stores and organizes data into one or more database tables. Each database table has a number of rows (i.e., records) and columns (i.e., fields). Each row in a table generally has a data value associated with each column of the table. This intersection between one row and one column is commonly referred to as a cell. This information may be business information relevant to a user operating device 102. Business information may be, for example, sales transactions, client information, advertisement information, etc. To access or perform analysis on this information stored in database storage 114, service provider 112 issues a request in the form of a query. In an embodiment, database storage 114 is configured to respond to queries issued by display device 102 over network 110. For example, service provider 112 may provide this configuration.

In an embodiment, display device 102 implements client 104 to enable users to query database storage 114. Client 104 may query database storage 114 directly or indirectly via service provider 112. Client 104 can be a thin client or a thick client. In an embodiment, client 104 is an application, e.g., mobile application, downloaded from service provider 112 via network 110. Display device 102 is any computing device capable of connecting to network 110 and having a screen for displaying data. For example, a computing device may be a laptop, a desktop computer, a tablet, a wearable device, or a mobile device (e.g., a mobile phone).

In an embodiment, client 104 includes a graphical user interface (GUI) 106 and query component 108. GUI 106 presents various graphical icons that enables users to interact with data from database storage 114. Query component 106 formats selected graphical icons or input received from GUI 106 into one or more queries. Then, query component 106 issues this queries to database storage 114 or service provider 112 via network 110.

In an embodiment, GUI 106 generates one or more charts to graphically represent query results within a display area of display device 102. The display area may be, for example, a window or container operated by client 104 and displayed on display device 102. The display area, when maximized (if allowable), can be at its largest, the size of the display screen of display device 102. In an embodiment, GUI 106 includes selectable graphical icons to enable a use to select a desired chart to graphically present query results within the display area. For example, selectable charts may include column charts, bar charts, line charts, area charts, scatter charts, among other types of charts having an x-axis and a y-axis. The chart type may be selected based on the type of data to graph. For example, line charts are commonly selected to display trends over time.

In an embodiment, GUI 106 generates a chart that is dynamically adjusted. Particularly, GUI 106 implements a chart having scale labels whose presentation are dynamically adjusted to maintain readability of these labels regardless of the allotted display area on display device 102. These dynamically-adjusted scale labels may include one or more scale labels for the x-axis, the y-axis, or both of the chart. In an embodiment, based on a received command to re-render the chart, GUI 106 determines whether to update a scale in the x-axis or y-axis of the chart. Based on this determination, GUI 106 further adjusts a presentation of corresponding scale labels to maintain readability.

In contrast to conventional charts having scale labels whose font sizes are reduced, GUI 106 maintains a font size of displayed scale labels. By maintaining a minimum font size, GUI 106 presents scale labels that are consistently presented and viewable by users without needing to squint or leaning closer to a screen of display device 102. For example, GUI 106 may keep the font size of displayed scale labels to 12-point font. In an embodiment, to further maintain readability, GUI 106 rotates a scale label's orientation or omit certain scale labels, as described below with respect to FIGS. 2-9.

Figure 2:
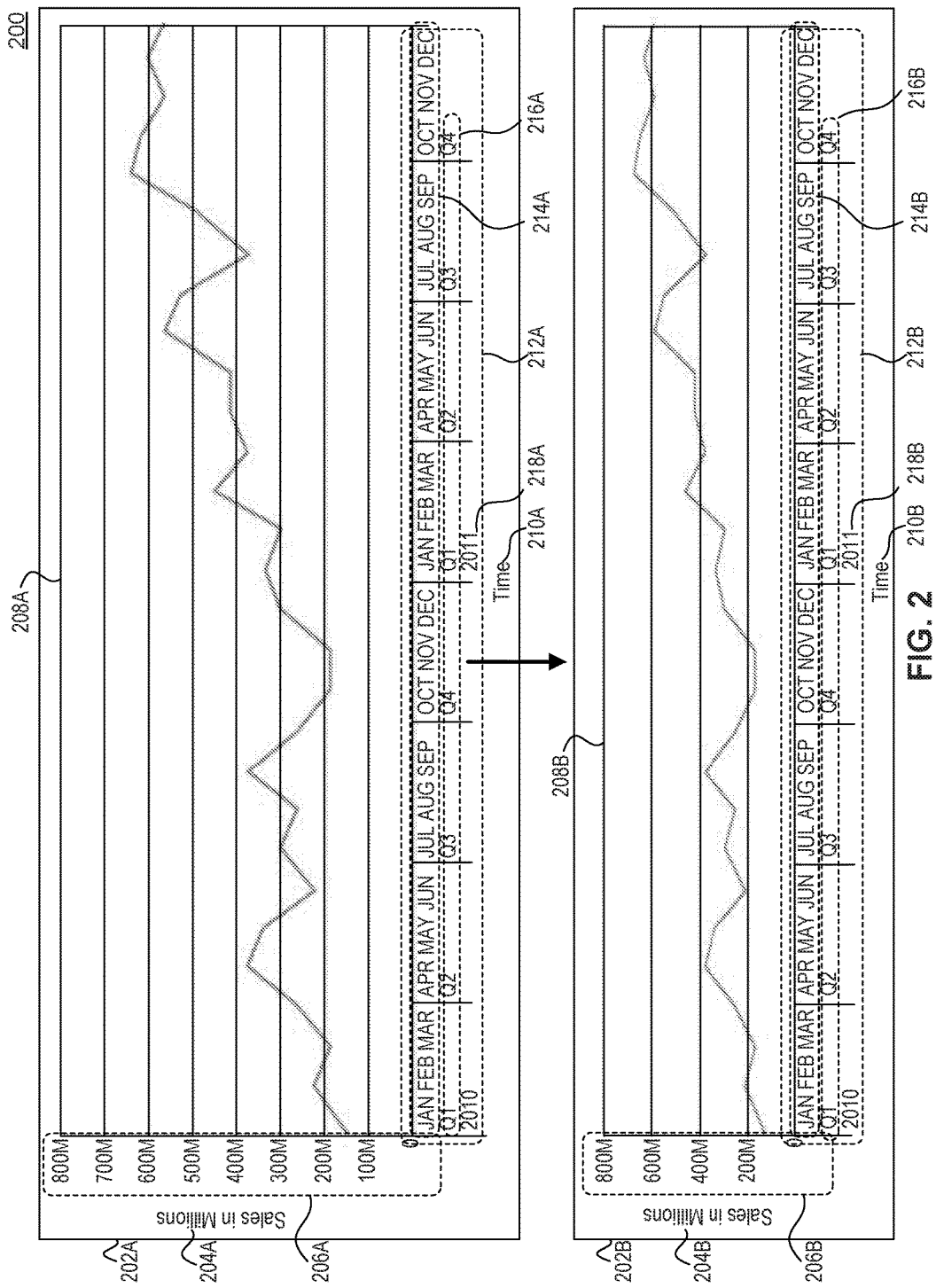
FIG. 2 shows an example diagram of how a graphical user interface (GUI) adjusts a chart when the chart is vertically resized according to some implementations.

FIG. 2 shows an example diagram 200 of how a GUI adjusts a chart 202 when chart 202 is vertically resized according to some implementations. In an embodiment, the GUI resizes chart 202 when the GUI receives a command to resize a display area presenting chart 202. The GUI, such as GUI 106 from FIG. 1, may generate chart 202A as shown. Though, the GUI may generate chart 202, which is a line chart, the GUI may also generate other types of charts having an x-axis and y-axis. Chart 202 shows that a set of data has been graphically represented as graph 208.

Chart 202 includes y-axis 204 (e.g., Sales in Millions), y-axis scale labels 206 (values in millions), x-axis 210 (e.g., Time), and x-axis scale labels 212 (e.g., year, quarter, or month). As described with respect to FIG. 1, the GUI enables a user to select what type of data to graph. The GUI may also enable the user to select related groups of x-axis scales to include in chart 202. For example, as shown in chart 202, x-axis scale labels 212 may include a hierarchy of scale levels including month scale 214, quarter scale 216, and year scale 218. In an embodiment, the most granular scale level, e.g., month scale 214 in this example, is displayed as being closest to the x-axis.

In an embodiment, as chart 202 is vertically resized, e.g., whose height is reduced, form chart 202A to 202B, the GUI shrinks graph 208A vertically to graph 208B. The GUI also dynamically adjusts y-axis scale labels 206A to y-axis scale labels 206B. In an embodiment, the GUI reduces the distance between adjacent horizontal gridlines, and determines whether the distance between adjacent horizontal gridlines lines, corresponding to y-axis scale labels 206A, is below or meets a threshold. If this occurs, then adjacent y-axis scale labels 206A may start to become too close to each other and hinder readability. Therefore, the GUI omits every other y-axis label 206A and corresponding horizontal gridline, shown as y-axis label 206B in resized chart 202B.

Figure 3A:
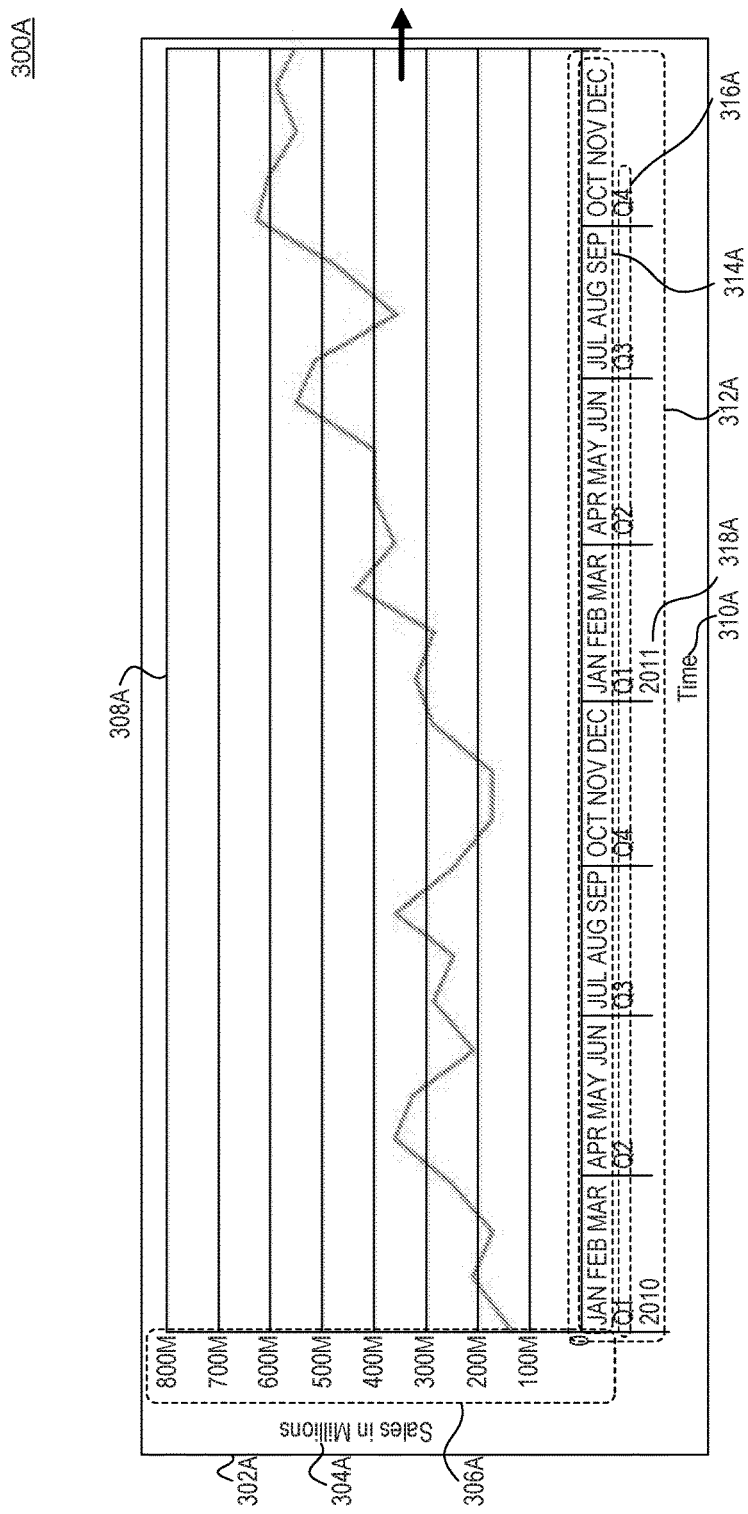
FIGS. 3A-B show example diagrams of how a GUI adjusts a chart when the chart is resized horizontally according to some implementations.
Figure 3B:
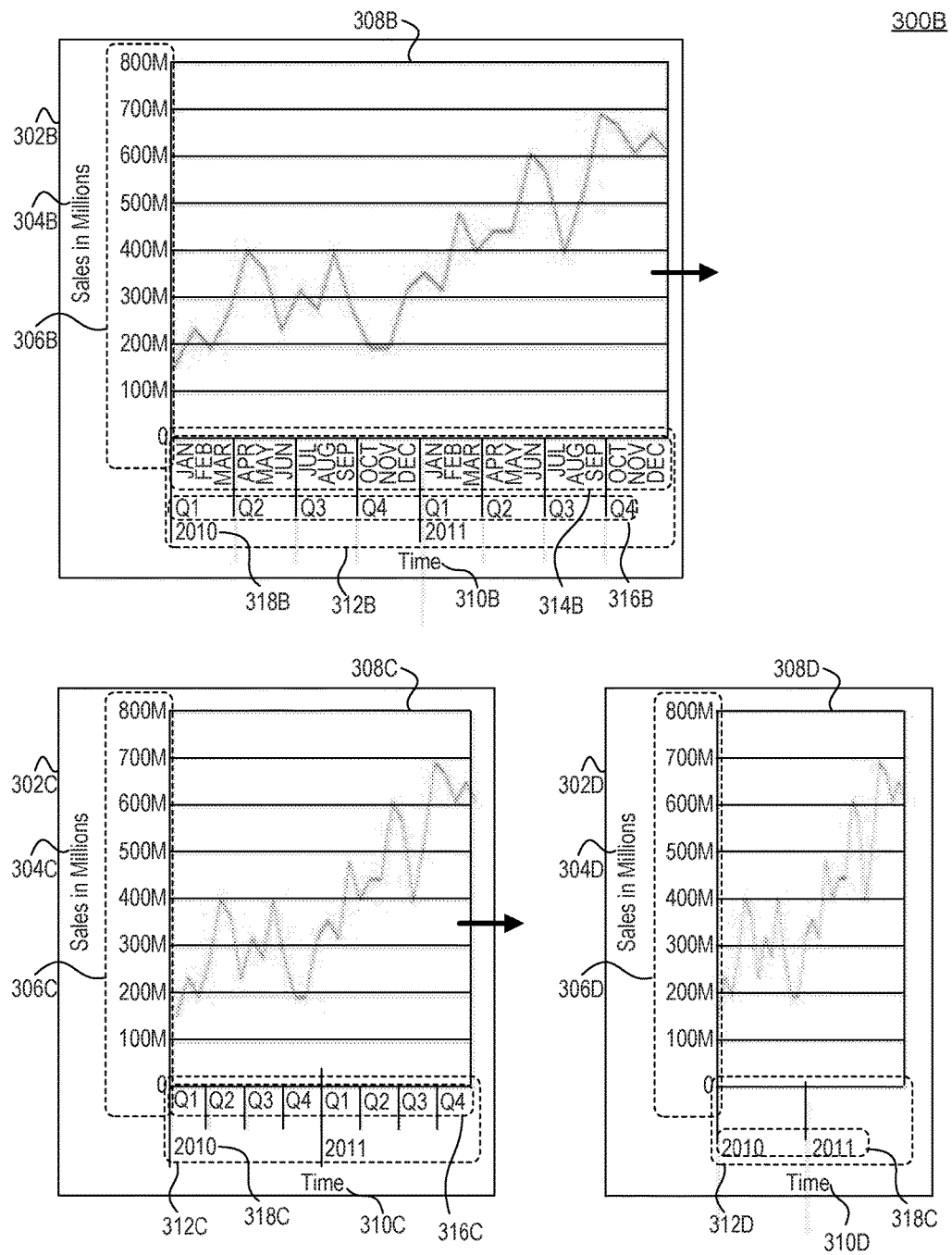

FIG. 3 show example diagrams 300A-B of how a GUI adjusts a chart 302 when chart 302 is horizontally resized according to some implementations. In an embodiment, the GUI resizes chart 302 when the GUI receives a command to resize a display area presenting chart 302. The GUI, such as GUI 106 from FIG. 1, may generate chart 302A as shown. Chart 302 shows that a set of data has been graphically represented as graph 308.

Like chart 202 from FIG. 2, chart 302 includes y-axis 304 (e.g., Sales in Millions), y-axis scale labels 306 (values in millions), x-axis 310 (e.g., Time), and x-axis scale labels 312 (e.g., year, quarter, or month). As described with respect to FIG. 1, the GUI may enable the user to select related groups of x-axis scales to include in chart 302. For example, as shown in chart 302, x-axis scale labels 312 may include a hierarchy of scale levels including month scale 314, quarter scale 316, and year scale 318. In an embodiment, the most granular scale level, e.g., month scale 314 in this example, is displayed as being closest to the x-axis.

In an embodiment, as chart 302 is horizontally resized, e.g., whose width is reduced, form chart 302A to 302B, the GUI shrinks graph 308A horizontally to graph 308B. The GUI also dynamically adjusts x-axis scale labels 312A to x-axis scale labels 312B. In an embodiment, the GUI reduces the distance between adjacent x-axis scale labels 312A, and determines whether this reduced distance is below or meets a threshold. If the distance is within the threshold, then adjacent x-axis scale labels 312A may start to become too close to each other and hinder readability. Therefore, in an embodiment, the GUI rotates each of x-axis scale labels 312A towards a vertical orientation. The GUI may rotate x-axis scale labels 312A until the distance is no longer within the threshold. As shown in chart 302B, x-axis scale labels 312 may be displayed in vertical orientations.

In an embodiment, as chart 302B is horizontally resized, e.g., whose width is reduced, form chart 302B to 302C, the GUI shrinks graph 308B horizontally to graph 308C. The GUI also dynamically adjusts x-axis scale labels 312B to x-axis scale labels 312C. In an embodiment, the GUI reduces the distance between adjacent x-axis scale labels 312B, and determines whether this reduced distance is below or meets a threshold. If the distance is within the threshold and x-axis scale labels 312 cannot be further rotated towards a vertical orientation, then the GUI omits the most granular scale level, e.g., month scale 314B, from being displayed. As shown in chart 302C, remaining x-axis scale labels 312C are those in quarter scale 316C and year scale 318C.

In an embodiment, as chart 302C's width is further reduced, the GUI determines whether the distance between adjacent x-axis scale labels 312C can be reduced without being within the threshold. When this threshold is again exceeded the GUI omits the next lowest and most granular level, e.g., quarter scale 316C within x-axis scale labels 312C. In this embodiment, the GUI horizontally reduces graph 308C to graph 308D in chart 302D and omits quarter scale 316C from being displayed in chart 302D. Thus, adjacent x-axis scale labels 312D in chart 302D maintain a distance exceeding the threshold to maintain readability. In an embodiment, should GUI not be able to adjust chart 302 to maintain readability of x-axis scale labels 312, the GUI prevents a resize command from completing. This further maintains a readability of x-axis scale labels 312 as chart 302's width is reduced.

Figure 4:
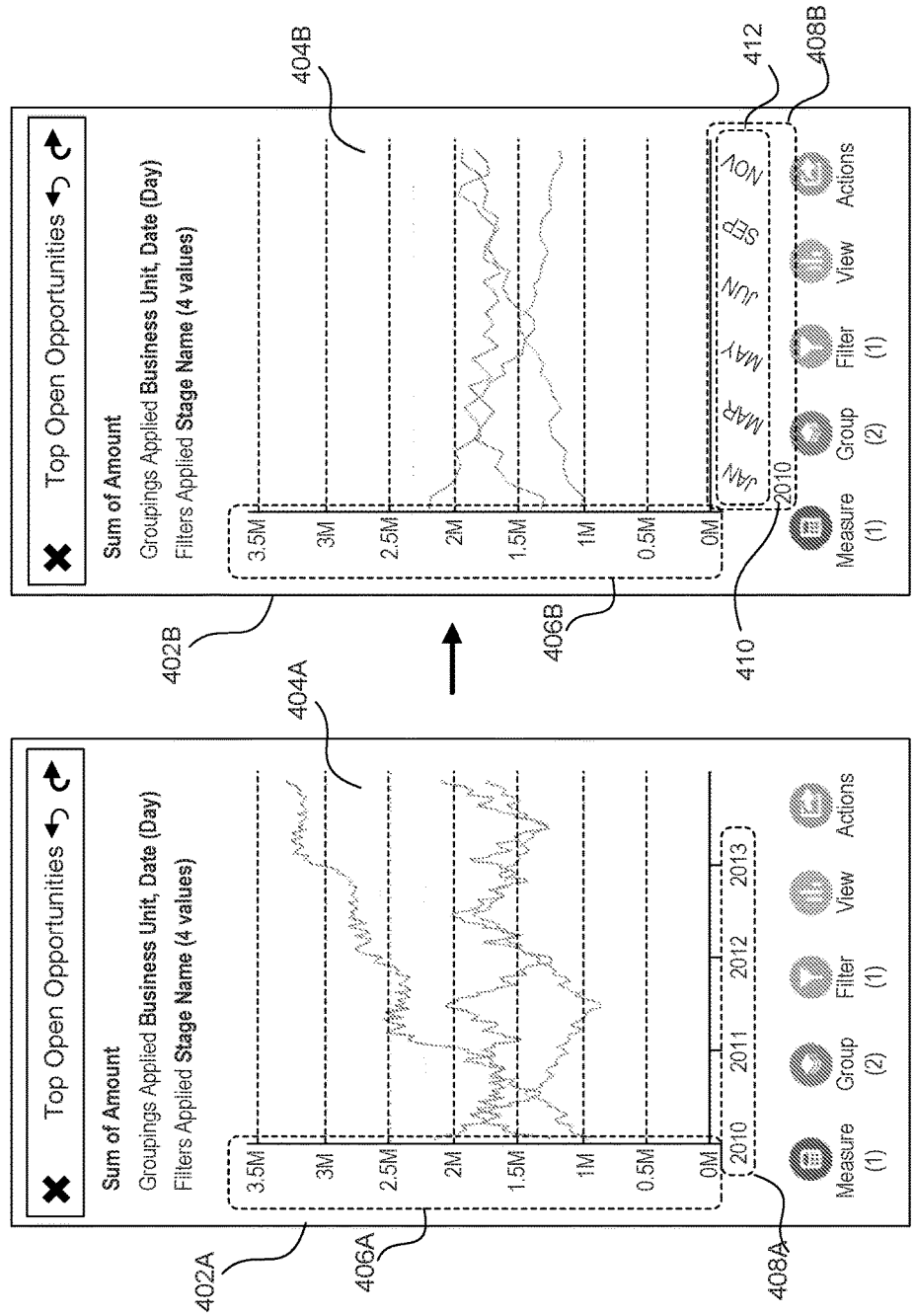
FIG. 4 shows an example diagram of how a GUI adjusts a chart when zooming horizontally within the chart according to some implementations.

FIG. 4 shows an example diagram 400 of how a GUI adjusts chart 402 when zooming horizontally within chart 402 according to some implementations. A GUI, such as GUI 106 from FIG. 1, may generate chart 402 as shown in diagram 400.

In an embodiment, the GUI generates chart 402 showing graph 404 representing a set of data. This data may be queried from, for example, database storage 114 as described with respect to FIG. 1. In an embodiment, the GUI generates chart 402 having x-axis scale labels 408 (e.g., years) and y-axis scale labels 406 (e.g., sales in millions).

In an embodiment, the GUI detects an input received from the user. The GUI may determine the received input is a request to horizontally zoom in/out of a portion of chart 402A. In an embodiment, the input may be a touch gesture (e.g., a pinch in/out in the horizontal direction) when a display device presenting chart 402 has a touch screen. In an embodiment, the input may be a mouse input including, for example, a wheel scroll, one or more clicks, a dragging motion across chart 402, etc.

In an embodiment (not shown), when the received input is a request to zoom out horizontally, the GUI displays more data in graph 404A. As part of zooming out, the GUI expands the number of x-axis scale labels 408A to include one or more additional scale labels, e.g., year 2009 or year 2014, based on the amount of zooming out.

In an embodiment, when the received input is a request to zoom in horizontally, the GUI displays a portion of graph 404A in greater granularity to generate chart 402B. The GUI also dynamically adjusts x-axis scale labels from 408A to 408B. In an embodiment, based on the horizontal span of the values displayed within graph 404B, the GUI can display more granular x-axis scale labels 408B such as month scale 412 instead of the yearly values of x-axis scale labels 408A. In an embodiment, the horizontal span represents the difference between a data point in graph 404B having the maximum x-axis value and a data point in graph 404B having the minimum y-axis value.

In an embodiment, the GUI displays x-axis scale labels 408B including multiple scale levels of different granularity. For example, chart 402B includes both month scale 412 and year scale 410 in its y-axis scale labels 408B. In an embodiment, to provide a more responsive and streamlined interface, the GUI increases the thickness of graph 404 when zooming in, and vice versa.

In an embodiment, the GUI dynamically adjusts how x-axis scale labels are presented as user interact with chart 402 to zoom in or out using the same mechanisms as described with respect to FIG. 3 and as further described below with respect to FIGS. 7-8. For example, as more x-axis scale labels 408A are added in the zooming out scenario, the distance between adjacent x-axis scale labels 408A may fall within a threshold, i.e., become too close. When this happens, the GUI may rotate an orientation of each of x-axis scale labels 408A towards a vertical orientation, among other described mechanisms.

In an embodiment, for the zooming in scenario and as shown in chart 402B, a more granular scale, e.g., month scale 412, is used. Similar to the zooming out scenario, the GUI determines whether the distance between adjacent x-axis scale labels 408B are within the threshold, the GUI rotates x-axis scale labels 408B towards a vertical orientation as shown. Other mechanisms are described with respect to FIGS. 3, 7, and 8.

Figure 5:
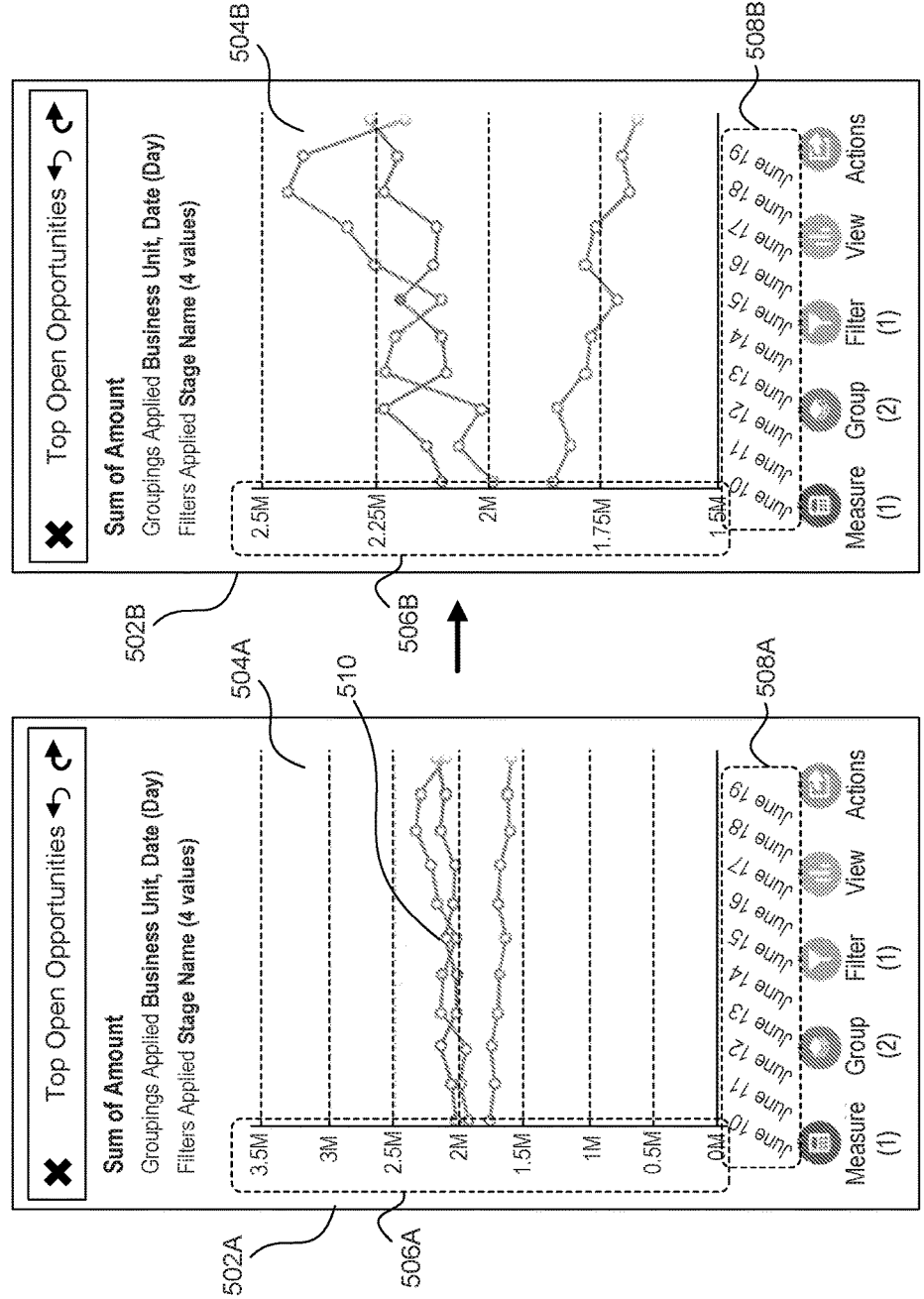
FIG. 5 shows an example diagram of how a GUI adjusts a chart when zooming vertically within the chart according to some implementations.

FIG. 5 shows an example diagram of how a GUI adjusts chart 502 when zooming vertically within chart 502 according to some implementations. A GUI, such as GUI 106 from FIG. 1, may generate chart 502 as shown in diagram 500.

In an embodiment, the GUI generates chart 502 showing graph 504 representing a set of data. This data may be queried from, for example, database storage 114 as described with respect to FIG. 1. In an embodiment, the GUI generates chart 502 having x-axis scale labels 508 (e.g., dates in June) and y-axis scale labels 506 (e.g., sales in millions).

In an embodiment, the GUI detects an input received from the user. The GUI may determine the received input is a request vertically zoom in/out of chart 502A. In an embodiment, the input may be a touch gesture (e.g., a pinch in/out in the vertical direction) when a display device presenting chart 502 has a touch screen. In an embodiment, the input may be a mouse input including, for example, a wheel scroll, one or more clicks, a dragging motion across chart 502, etc.

In an embodiment (not shown), when the received input is a request to zoom out vertically, the GUI displays more data in graph 504A. As part of zooming out, the GUI expands y-axis scale labels 506A to include one or more additional scale labels, e.g., 4.0 M or 4.5 M, based on the amount of zooming out.

In an embodiment, when the received input is a request to zoom in vertically, the GUI displays a portion of graph 504A in greater granularity to generate chart 502B. As shown in chart 502B, char 504B also fills up more of chart 502B as compared to chart 502A. In an embodiment, the GUI also dynamically adjusts y-axis scale labels from 506A to 506B. In an embodiment, based on the vertical span of the values displayed within graph 504B, the GUI determines a number of horizontal gridlines to include in chart 502B. Then, the GUI displays these horizontal gridlines and corresponding y-axis scale labels 506B. In an embodiment, the vertical span represents the difference between a data point in graph 504B having the maximum y-axis value and a data point in graph 504B having the minimum y-axis value. In an embodiment, to provide a more responsive and streamlined interface, the GUI increases the thickness of graph 504 when zooming in, and vice versa.

In an embodiment, the GUI dynamically adjusts how y-axis scale labels are presented as user interact with chart 502 to zoom in or out using the same mechanisms as described with respect to FIG. 2 and as further described below with respect to FIG. 7. For example, as more y-axis scale labels 506A are added in the zooming out scenario, the distance between adjacent y-axis scale labels 506A may fall within a threshold, i.e., become too close. When this happens, the GUI may omit every other y-axis label 506A, among other described mechanisms.

In an embodiment, for the zooming in scenario and as shown in chart 502B, y-axis scale labels 506B provide a more granular scale, e.g., ranging from 1.5 M to 2.5 M as opposed to 0 M to 3.5 M in chart 502A. Similar to the zooming out scenario, the GUI determines whether the distance between adjacent y-axis scale labels 506B are within the threshold. When the determined distance is within the threshold, the GUI may omit every other y-axis label 506B, among other described mechanisms.

Figure 6:
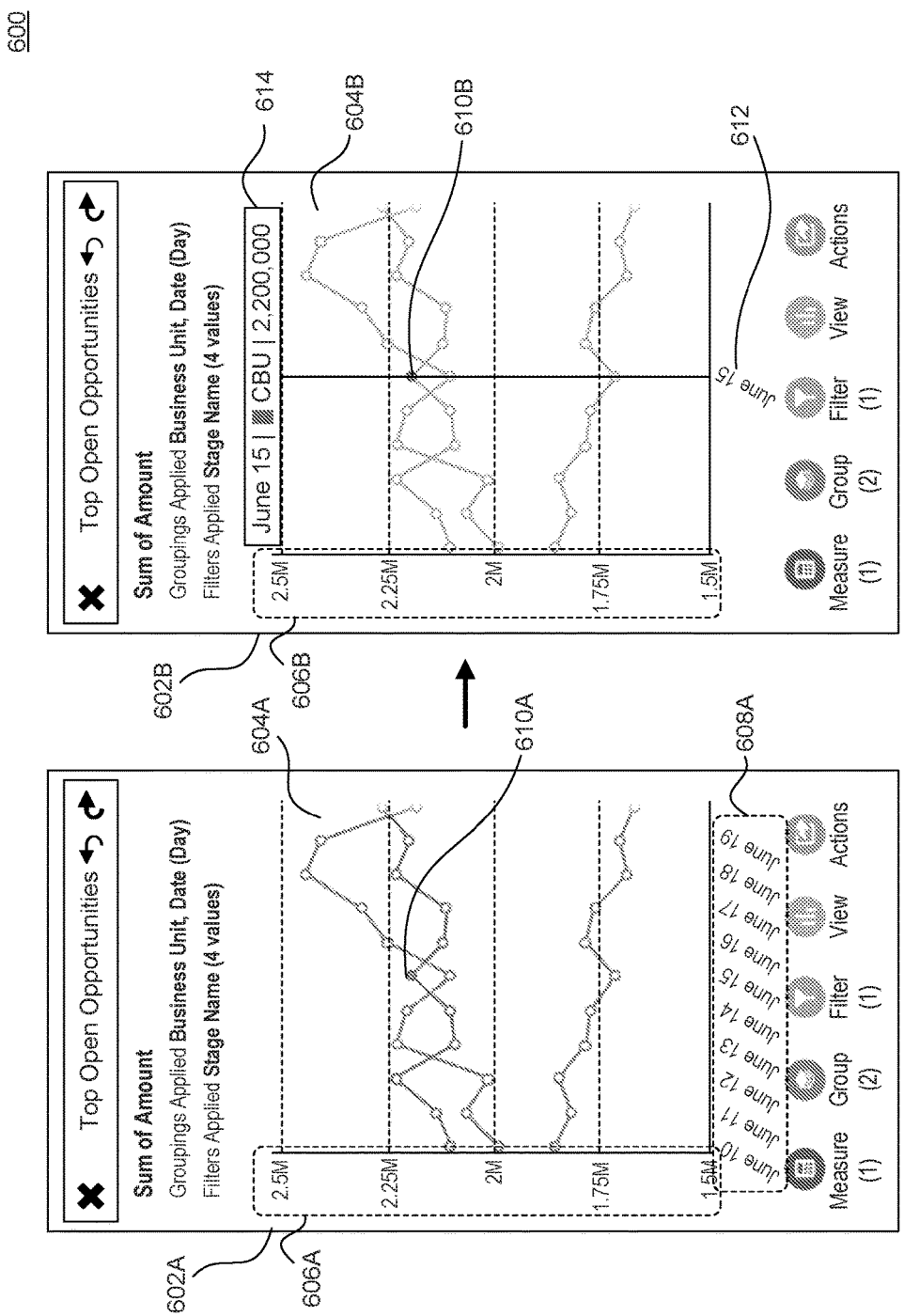
FIG. 6 shows an example diagram of selectable data points within a chart implemented by a GUI according to some implementations.

FIG. 6 shows an example diagram 600 of selectable data points within a chart 602 according to some implementations. A GUI, such as GUI 106 from FIG. 1, may generate chart 602 as shown in diagram 600.

In an embodiment, the GUI generates chart 602 having x-axis scale labels 608 and y-axis scale labels 606. As shown, chart 602A shows graph 604A for three trends in millions of sales, as depicted by y-axis scale labels 606A, across consecutive dates in June, as depicted by x-axis labels 608A. In an embodiment, the GUI determines whether the number of data points in one or more trends exceeds a maximum number. Upon determining that this maximum number is not exceeded, the GUI presents data within graph 604A as selectable data points. For example, chart 602A shows selectable point 610A.

In an embodiment, a user operating the GUI can select selectable point 610A via touch, a gesture, a mouse click, or other inputs to a display device presenting chart 602A. Upon detecting the user's input, the GUI shows chart 602B including a GUI element 614 and x-axis emphasis 612. X-axis emphasis 612 may be a vertical line running through selectable point 610B, representative of a y-axis value, e.g., June $5^{th}$. In an embodiment, the GUI determines an x-axis value and a y-axis value that corresponds to selectable point 610 to be presented within GUI element 614. GUI element 614 may be displayed on top of chart 602B to improve readability. In an embodiment where graph 604A includes multiple trends, GUI element 614 indicates the specific trend, e.g., "CBU," of selectable point 610.

II. Example Method

Figure 7:
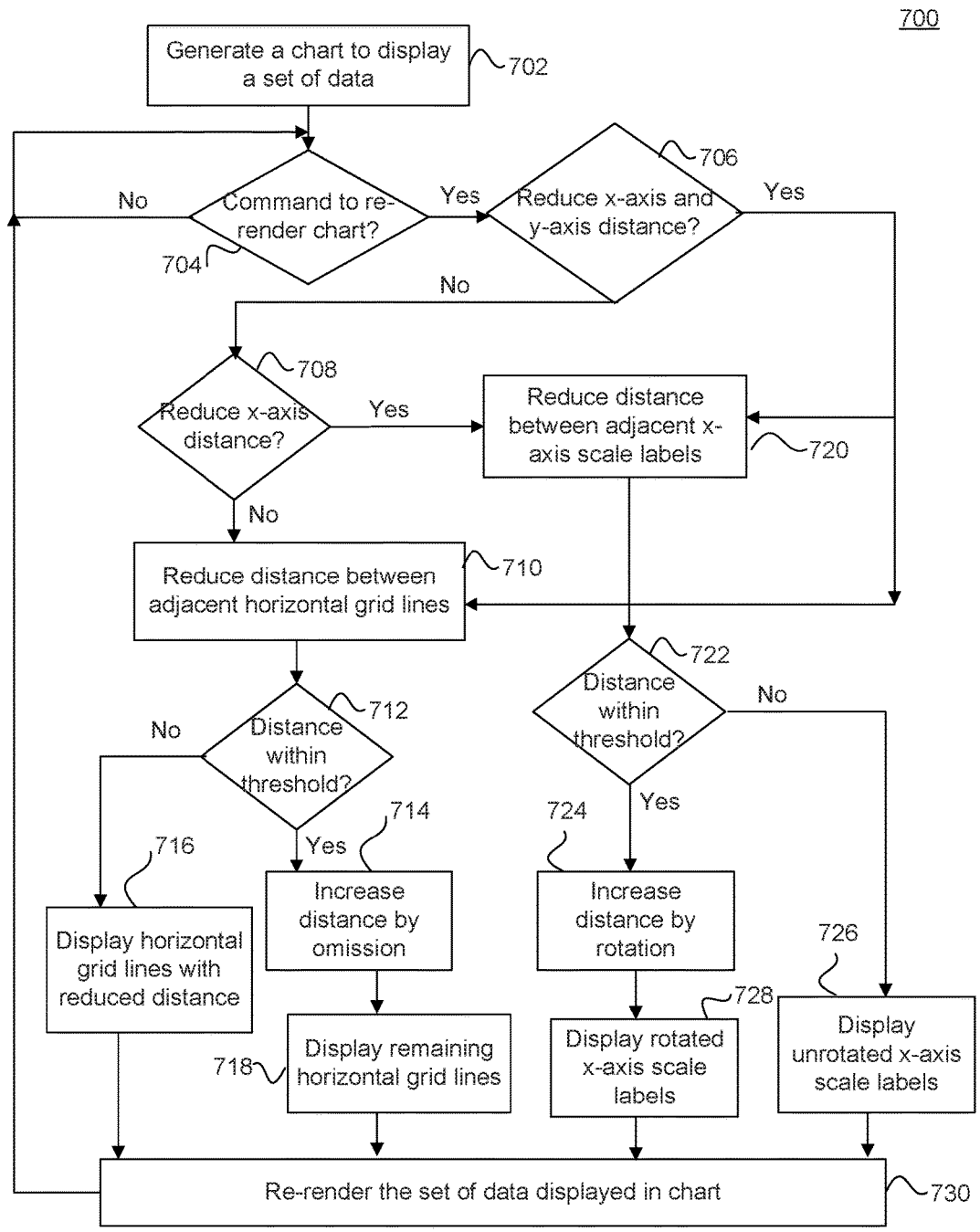
FIG. 7 shows an example method for dynamically adjusting scale labels of a chart according to some implementations.

FIG. 7 illustrates an example method 700 for dynamically adjusting scaling labels of a chart according to some implementations. Method 700 can be performed by processing logic that may comprise hardware (e.g., circuitry, dedicated logic, programmable logic, microcode, etc.), software (e.g., instructions running on a processing device), or a combination thereof. In an embodiment, steps of method 700 can be performed by GUI 106 of client 104 from FIG. 1.

In step 702, a GUI, implemented by a client operating on a display device, generates a chart having an x-axis and a y-axis to display a set of data within a display area of the display device. The display area may be a portion of the display device's screen allotted to the client. For example, the display area may be a window. In an embodiment, the display area includes x-axis scale labels and y-axis scale labels along the chart's x-axis and y-axis, respectively. The x-axis and y-axis scale labels indicate a scale of the chart's x-axis and y-axis, respectively. In an embodiment, the GUI generates a chart having horizontal gridlines that each correspond to a displayed y-axis scale label.

In an embodiment, the GUI receives the set of data based on one or more queries issued to an external database storage, such as database storage 114 of FIG. 1. As shown in FIGS. 2-3, the GUI may generate a line chart to represent, for example, a trend (shown on the y-axis) over a period of time (represented on the x-axis).

In step 704, the GUI detects whether a command to re-render the chart is received. In an embodiment and as described with respect to FIGS. 2-3, the command is to reduce a size of the display area and causes the chart to be resized. In an embodiment, the command can be to reduce the display area's height, width, or both. In an embodiment and as described with respect to FIGS. 4-5, the command is to zoom in/out of the chart. In an embodiment, the command can be to zoom in/out horizontally, vertically, or both. In an embodiment, the command may be issued by a user operating the display device via touch, mouse click, mouse click and drag, or other types of inputs. When the command is received, method 700 proceeds to step 706. Otherwise, GUI 704 waits until such a command is detected.

In step 706, the GUI determines whether the command causes the distance between adjacent x-axis scale labels and adjacent y-axis scale labels to be reduced. If this is the case, method 700 proceeds to both steps 710 and 720. Otherwise, method 700 proceeds to step 708.

In an embodiment and as described with respect to FIGS. 2-3, the command is to reduce both the height and width of the display area. By reducing the size of the display area in both dimensions, more scale labels need to be displayed in less available space, which requires the space between adjacent scale labels to be reduced.

In an embodiment and as described with respect to FIGS. 4-5, the command is to zoom out both horizontally and vertically, which requires more scale labels to be displayed in the same space. In an embodiment, the command may be to zoom-in in one or both dimensions depending on the granularity of scale labels requested to be presented in the chart. For example, when zooming in horizontally from chart 404A to 402B of FIG. 4, the GUI determines that a different, more granular month scale 412 should be displayed. As shown in diagram 400, month scale 412 has six x-axis scale labels 408B as compared to the four x-axis scale labels of 408A within the same horizontal size of chart 402. Thus, the distance between the adjacent x-axis scale labels in month scale 412 need to be reduced from the distance between x-axis scale labels 408A of chart 402A.

In step 708, the GUI determines whether the command causes the distance between adjacent x-axis scale labels to be reduced. If this is the case, method 700 proceeds to step 720. Otherwise, method 700 proceeds to step 110 because the command causes the distance between adjacent y-axis scale labels to be reduced.

In an embodiment and as described with respect to FIGS. 2-3, the command determined to reduce the distance is a command to reduce the width of the display area, thereby also reducing a width of the chart. In an embodiment and as described with respect to FIGS. 4-5, the command determined to reduce the distance is a command to zoom out horizontally. In an embodiment, the command to reduce the distance is a command to zoom in horizontally when the GUI uses a more granular x-axis scale for the zoomed-in data.

In an embodiment, the command is determined to not reduce the distance when the command is to increase the width of the display area. In an embodiment, the command is determined to not reduce the distance when the command is to zoom in horizontally while using the same x-axis scale.

In step 710, the GUI reduces a distance, e.g., pixel distance, between adjacent horizontal gridlines and corresponding y-axis scale labels based on the command of step 704. In an embodiment when the command is a resize command, the GUI reduces the distance in proportion to how much the height of the display area is reduced. By reducing this distance, the GUI effectively shrinks the height of the chart to fit within the resized display area. In an embodiment when the command is a zoom in/out command, the GUI reduces the distance in proportion to how many horizontal gridlines (and associated y-axis scale labels) to display in the chart.

In step 712, the GUI determines whether the distance between any two adjacent horizontal gridlines is within a threshold. For example, the GUI determines whether the pixel distance between any two adjacent horizontal gridlines is below or at 100 pixels, though other values may be used. If the determined distance is within the threshold, method 700 proceeds to step 714. Otherwise, method 700 proceeds to step 716.

In step 716, the GUI displays every horizontal gridline and corresponding y-axis label with the reduced distance, from 710, between adjacent horizontal gridlines. Since, no distance was within the threshold in step 712, the GUI may display the horizontal gridlines and corresponding y-axis scale labels without hindering a user's readability of the y-axis scale labels.

In step 714, the GUI increases the distance between adjacent horizontal gridlines by omitting every other horizontal gridline and associated y-axis scale label from being displayed. In an embodiment, the GUI iteratively omits every other horizontal gridline until the distance between every adjacent horizontal gridlines exceeds the threshold of step 712.

In step 718, the GUI displays the remaining horizontal gridlines and corresponding y-axis scale labels in the re-rendered chart. Depending on the command, the GUI displays the remaining horizontal gridlines in a zoomed in/out chart or a resized display area. The remaining horizontal gridlines are gridlines that were not omitted from display in step 714.

Returning to step 708, when the GUI determines that the command causes the distance between adjacent x-axis scale labels to be reduced, method 700 proceeds to step 720. In step 720, the GUI reduces a distance, e.g., pixel distance, between adjacent x-axis scale labels based on the command of step 704. In an embodiment when the command is a resize command, the GUI reduces the distance in proportion to how much the width of the display area is reduced. By reducing this distance, the GUI effectively shrinks the width of the chart to fit within the resized display area. In an embodiment when the command is a zoom in/out command, the GUI reduces the distance in proportion to how many x-axis scale labels to display in the chart.

In step 722, the GUI determines whether the distance between any two adjacent x-axis scale labels is within a threshold. For example, the GUI determines whether the pixel distance between any two adjacent x-axis scale labels is below or at 12 pixels, though other values may be used. When any portion of an x-axis scale label is within the threshold of a portion of an adjacent x-axis scale label, it may be difficult for the user to differentiate between and distinctly read the x-axis labels. If the determined distance is within the threshold, method 700 proceeds to step 724. Otherwise, method 700 proceeds to step 726.

In step 726, the GUI displays the x-axis scale labels that are un-rotated and with the reduced distance, from step 720, between adjacent x-axis scale labels. Since, no distance was within the threshold in step 722, the GUI may display adjacent x-axis scale labels with reduced distances without hindering a user's readability of the x-axis scale labels.

In step 724, the GUI increases the distance between adjacent x-axis scale labels by rotating an orientation of each of the displayed x-axis scale labels from a current orientation (e.g., a horizontal orientation) towards a vertical orientation. In an embodiment, each of the x-axis scale labels are rotated clockwise (or counterclockwise) by the same amount, e.g., in radians or degrees. In an embodiment, the GUI rotates the x-axis labels until no distance between adjacent x-axis labels is within the threshold of step 722. In an embodiment, the GUI iteratively rotates the x-axis labels by an increment until no distance between adjacent x-axis labels is within the threshold of step 722.

In step 728, the GUI displays the rotated x-axis scale labels of step 724 within the re-re-rendered chart. Depending on the command, the GUI displays the rotated x-axis scale labels in a zoomed in/out chart or a resized display area. In an embodiment, each of the x-axis scale labels may be in a vertical orientation.

In step 730, the GUI re-renders the data displayed in the chart according to the command of step 704. In an embodiment when the command is to reduce a size of the display area, the GUI re-renders the chart within a chart of the resized display area. In an embodiment when the command is to zoom in/out of the chart, the GUI re-renders the chart to show zoomed in/out data. Method 700 proceeds to step 704 where the GUI can further dynamically adjust a presentation of the x-axis or y-axis scale labels based on a detected command.

Figure 8:
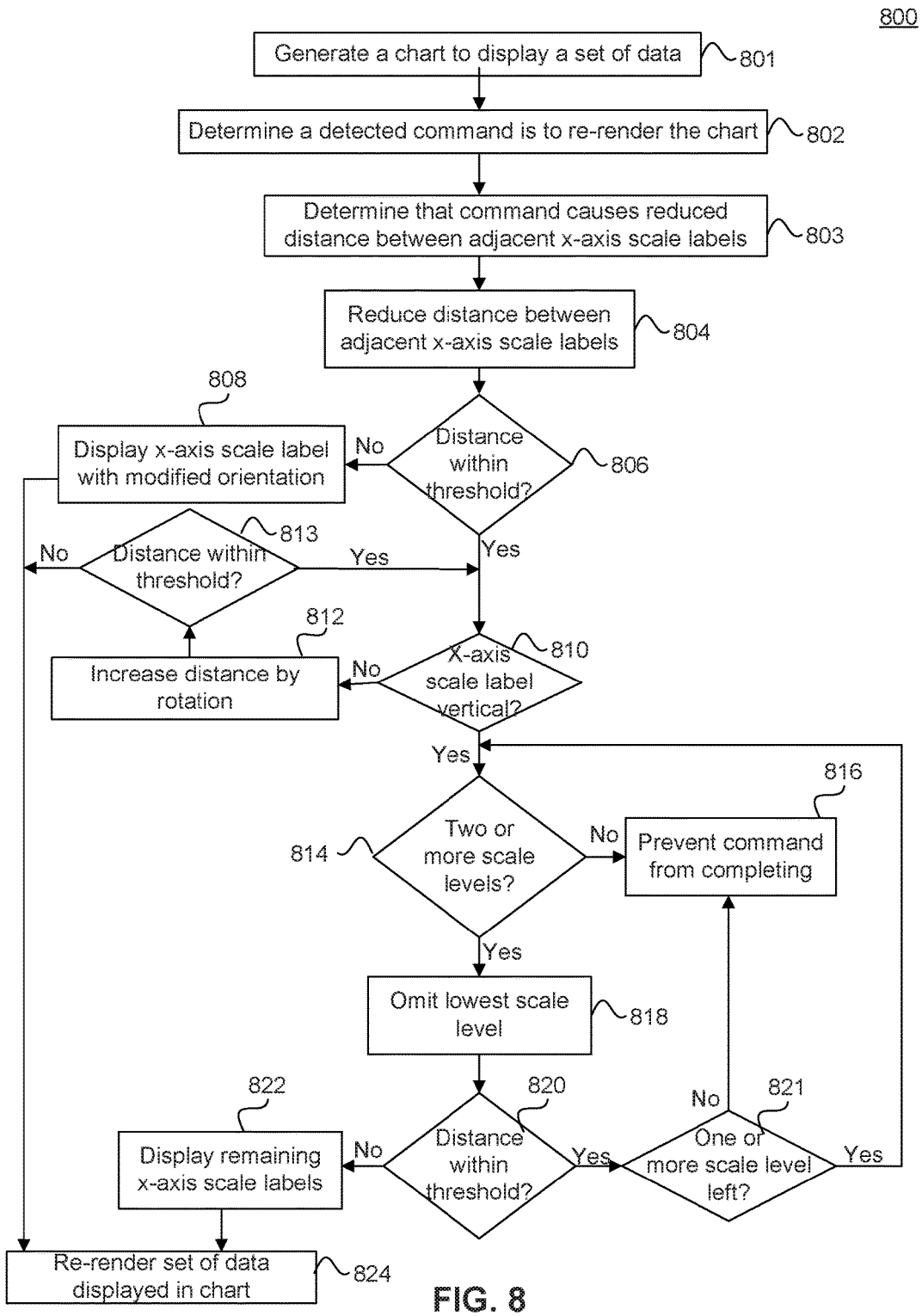
FIG. 8 shows an example method for dynamically adjusting x-axis scale labels of a chart according to some implementations.

FIG. 8 illustrates an example method 800 for dynamically adjusting x-axis scaling labels of a chart according to some implementations. Method 800 can be performed by processing logic that may comprise hardware (e.g., circuitry, dedicated logic, programmable logic, microcode, etc.), software (e.g., instructions running on a processing device), or a combination thereof. In an embodiment, steps of method 800 can be performed by GUI 106 of client 104 from FIG. 1. In an embodiment, one or more steps of method 800 can correspond to steps of method 700.

In step 801, a GUI, implemented by a client operating on a display device, generates a chart having an x-axis and a y-axis to display a set of data within a display area of the display device, much like step 702. In an embodiment, the GUI groups the x-axis labels in a hierarchy of stacked, scale levels. Each scale level includes a group of x-axis scale labels that together represents an x-axis scale for the set of graphed data. In this hierarchy of stacked, scale levels, a scale level closer to the x-axis may represent a more granular x-axis scale for the set of graphed data.

For example, as shown in FIG. 3, chart 308A has x-axis scale labels 312A including month scales 314A, i.e., the most granular scale, followed by quarter scales 316A, and year scales 312A, i.e., the least granular scale. In an embodiment, these scale levels represent different scales of representation for the x-axis and each scale level corresponds to a field of the set of data.

In step 802, the GUI determines a detected command is to re-render the chart. In an embodiment, the detected command may be to resize the display area or the chart, or to zoom in or out of the chart.

In step 803, the GUI determines that the command causes the distance between adjacent x-axis scale labels to be reduced, much like step 708 where such a determination is also made.

In step 804, the GUI reduces a distance, e.g., pixel distance, between adjacent x-axis scale labels based on the command of step 802, much like step 720.

In step 806, the GUI determines whether the distance between any two adjacent x-axis scale labels is within a threshold, much like step 722. If the determined distance is within the threshold, method 800 proceeds to step 810. Otherwise, method 800 proceeds to step 808.

In step 808, the GUI displays the x-axis scale labels with an unmodified orientation and with the reduced distance, from step 804, between adjacent x-axis scale labels. Since, no distance was within the threshold in step 806, the GUI can display adjacent x-axis scale labels with reduced distances without hindering a user's readability of the x-axis scale labels.

In step 810, the GUI determines whether an x-axis scale label has a vertical orientation. In an embodiment, the orientations of each x-axis label is the same so performing this determination on any one of the x-axis scale labels is sufficient. If the x-axis scale label has the vertical orientation, method 800 proceeds to step 814. Otherwise, method 800 proceeds to step 812.

In step 812, the GUI increases the distance between adjacent x-axis scale labels by rotating each x-axis scale label towards a vertical orientation, much like step 724. In an embodiment, the GUI may rotate the x-axis scale labels by an increment. In an embodiment, the x-axis scale labels within each scale level is rotated by the same amount. For example, display area 302B of FIG. 3 shows that each of scale levels have x-axis scale labels that are oriented the same, e.g., in a vertical orientation.

In step 813, the GUI determines whether the distance between two adjacent x-axis scale labels are within the threshold of step 806. If the distance remains within the threshold, method 800 proceeds to step 810, where the x-axis scale labels may be further rotated up to a vertical orientation.

In step 814, the GUI determines if two or more scale levels of x-axis scale labels remain. If so, method 800 proceeds to step 818. Otherwise, only one scale level of x-axis scale labels remains and method 800 proceeds to step 816.

In step 816, the GUI prevents the command of 801 from completing. This is because the x-axis scale labels have been rotated to a vertical orientation and no lower scale level can be omitted to prevent adjacent x-axis scale labels from being within a threshold, hindering readability. In an embodiment, by preventing the command to complete, the GUI maintains readability of the x-axis scale labels.

In an embodiment, depending on a type of the chart or type of graphed data, the GUI can omit every other x-axis scale label so as to further increase the distance between adjacent x-axis labels. For example, the GUI can perform this omission when the chart type has an x-axis with a continuous measure, such as a line chart. In an example, the GUI cannot perform this omission when the x-axis of the chart represents disparate concepts, such as often used in bar charts or column charts.

In step 818, when two or more scale levels remain, the GUI omits the lowest scale level of x-axis scale labels from being displayed for the chart in the display area. Since the lowest scale level of x-axis scale labels represents the most granular scale, the distance between adjacent x-axis scale labels in this scale level are the closest compared to the distances between adjacent x-axis scale labels in other scale levels in the hierarchy of stacked, scale levels of x-axis scale labels. Thus by omitting this lowest scale level from being displayed, the GUI ensures that the distance between adjacent x-axis scale labels are not within the threshold of step 806.

In step 820, the GUI determines whether the distance between any two adjacent x-axis scale labels is within a threshold, much like step 806. If the determined distance is within the threshold, method 800 proceeds to step 821. Otherwise, method 800 proceeds to step 822.

In step 821, the GUI determines whether one or more scale levels of x-axis scale labels remain. If so, method proceeds to step 814. Otherwise, method 800 proceeds to step 816.

In step 822, the GUI displays the remaining, un-omitted x-axis scale labels within the re-rendered chart. These x-axis scale labels may have an adjusted orientation depending on whether step 812 was performed.

In step 824, the GUI re-renders the data displayed in the re-rendered chart, much like step 730.

Figure 9:
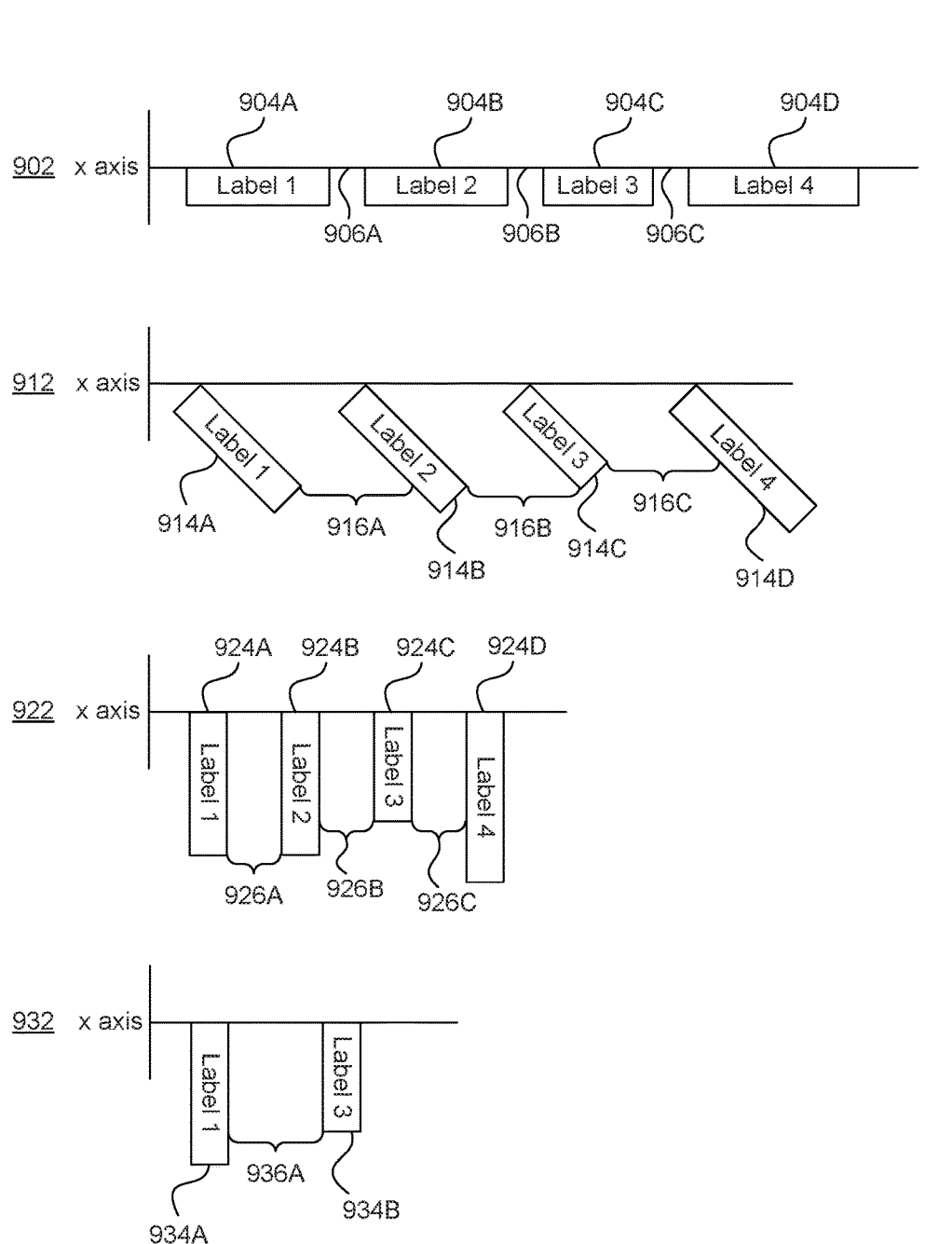
FIG. 9 shows an example diagram of how a GUI dynamically adjusts the x-axis scale labels according to some implementations.

FIG. 9 shows an example diagram 900 of how a GUI adjusts the x-axis scale labels as width of chart 902 is reduced according to some implementations. As described with respect to FIG. 7, the width of chart 902 may be reduced in accordance with how much the width of the display area is reduced. The depictions in diagram 900 may correspond to one or more steps of FIGS. 7-8 as described herein.

In chart 902, x-axis scale labels 904 may remain in a horizontal orientation even as the width of chart 902 shrinks as long as distance 906 between adjacent x-axis scale labels 904 exceeds a threshold value, e.g., 12 pixels. In an embodiment, as the width of a display area is reduced, a GUI, such as GUI 106 of FIG. 1, reduces distance 906 between adjacent x-axis scale labels 904 to reduce the horizontal scale of chart 902 to fit within the reduced display area. In an embodiment, distance 906 is a shortest distance between any two portions of corresponding adjacent x-axis scale labels 904.

In an embodiment, when distance 906 is within a threshold, the GUI rotates x-axis scale labels 904 towards a vertical orientation as shown in resized chart 912. In chart 912, x-axis scale labels 914 are rotated such that distance 916 between adjacent x-axis labels 914 exceed the threshold. As chart 912 shrinks, the GUI rotates x-axis scale labels 914 towards a vertical orientation until x-axis scale labels 924 are presented vertically as shown in chart 922.

In chart 922, distance 926 between adjacent x-axis reference scales 924 cannot be reduced by further rotating x-axis reference scales 924 towards a vertical orientation. In an embodiment, when GUI receives a command to further horizontally reduce chart 922, the GUI prevents this command from completing. This guarantees that the x-axis scale labels do not overlap and remain at a minimum font size to retain readability. In an embodiment, the GUI can omit every other x-axis scale label 924 as shown in chart 932.

In chart 932, x-axis scale label 924B, "label 2," has been omitted such that distance 936 between adjacent x-axis scale labels 934 exceed or match the threshold.

Example Computer Implementation

Figure 10:
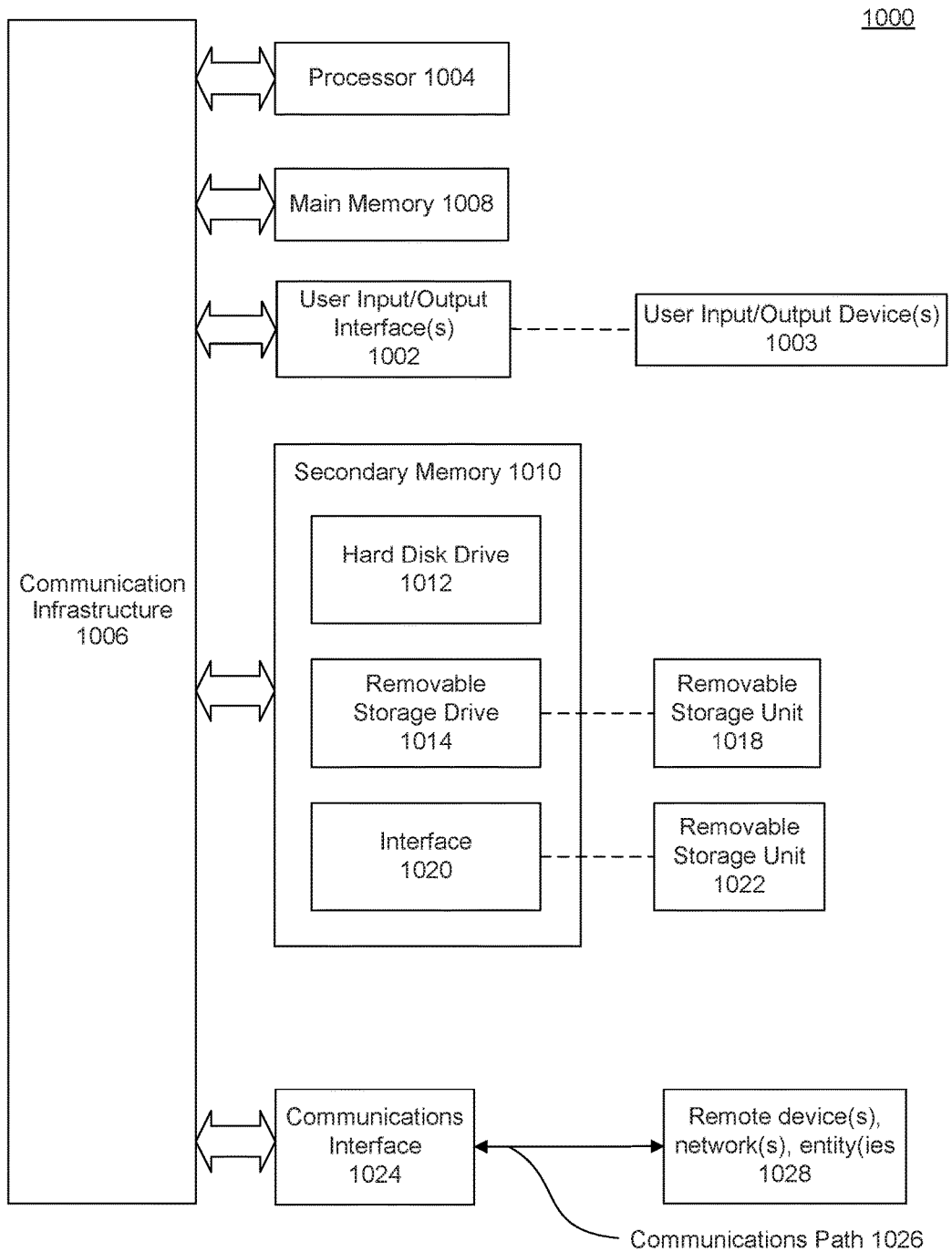
FIG. 10 shows an example computer system according to some implementations.

Various embodiments, such as display device 102 or service provider 102 of FIG. 1 can be implemented, for example, using one or more well-known computer systems, such as computer system 1000 shown in FIG. 10. Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more scale levels of cache. Main memory 1008 has stored therein control logic (i.e., computer software) or data.

Computer system 1000 may also include one or more secondary storage devices or memory 1010. Secondary memory 1010 may include, for example, a hard disk drive 1012 or a removable storage device or drive 1014. Removable storage drive 1014 may be a floppy disk drive, a magnetic tape drive, a compact disk drive, an optical storage device, tape backup device, or any other storage device/drive.

Removable storage drive 1014 may interact with a removable storage unit 1018. Removable storage unit 1018 includes a computer usable or readable storage device having stored thereon computer software (control logic) or data. Removable storage unit 1018 may be a floppy disk, magnetic tape, compact disk, DVD, optical storage disk, or any other computer-data storage device. Removable storage drive 1014 reads from and writes to removable storage unit 1018 in a well-known manner.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

According to an exemplary embodiment, secondary memory 1010 may include other means, instrumentalities, or other approaches for allowing computer programs, other instructions, or data to be accessed by computer system 1000. Such means, instrumentalities, or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired or wireless, and which may include any combination of LANs, WANs, the Internet, etc. Control logic or data may be transmitted to and from computer system 1000 via communication path 1026.

In an embodiment, a tangible apparatus or article of manufacture comprising a tangible computer-useable or -readable medium having control logic (software) stored thereon is also referred to herein as a computer-program product or program-storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of the invention using data processing devices, computer systems, or computer architectures other than that shown in FIG. 10. In particular, embodiments may operate with software, hardware, or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, or entities illustrated in the figures and described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
generating, by a graphical user interface (GUI) implemented on a display device comprising at least one computer processor, a chart to render a set of data for display within a display area of the display device, wherein the display area includes a first x-axis scale label of a first level of a hierarchy of scale levels and a second x-axis scale label of the first level of the hierarchy of scale levels, and at least one x-axis scale label of a second level of the hierarchy of scale levels, wherein the first level of the hierarchy of scale levels is more granular than the second level of the hierarchy of scale levels;
reducing, by the GUI, a distance between the first and second x-axis scale labels to a reduced distance, responsive to detecting a first command to re-render the chart;
automatically rotating, by the GUI, the first x-axis scale label towards a vertical orientation, responsive to a determination that the reduced distance is within a first threshold;

displaying, by the GUI, the set of data and the at least one rotated first or second x-axis scale labels within the chart as re-rendered according to the first command; and automatically re-rendering, by the GUI, the chart to display the set of data and the at least one x-axis scale label of the second level of the hierarchy of scale levels, omitting the first level of the hierarchy of scale levels, responsive to a determination that the display area is reduced in size within a second threshold.

2. The method of claim 1, wherein the first command reduces a width of the display area or zooms out of the chart.

3. The method of claim 1, wherein a font size of the at least one of the first or second x-axis scale labels remains the same throughout the generating, reducing, rotating, and displaying.

4. The method of claim 1, further comprising:
presenting, within the chart, the set of data as selectable data points;
responsive to receiving a selection of one of the selectable data points, determining an x-axis value and a y-axis value that correspond to the selection; and
displaying a GUI element on top of the line chart that shows the determined x-axis and y-axis scale labels.

5. The method of claim 1, wherein the at least one x-axis scale label of the second level of the hierarchy of scale levels comprises a plurality of rotated x-axis scale labels, further comprising:
reducing, by the GUI, a second distance between adjacent, rotated x-axis scale labels of the plurality of rotated x-axis scale labels, responsive to detecting a second command that re-renders the chart and that reduces the second distance between the adjacent rotated x-axis scale labels of the plurality of rotated x-axis scale labels;
determining, by the GUI, that the second distance is within a distance threshold;
increasing, by the GUI, the determined second distance beyond the distance threshold by omitting every other rotated x-axis scale label of the plurality of rotated x-axis scale labels from being displayed; and
displaying, by the GUI, the set of data and the un-omitted, rotated x-axis scale labels within the chart as re-rendered according to the second command.

6. The method of claim 1, wherein the at least one x-axis scale label of the second level of the hierarchy of scale levels comprises a first x-axis scale label of the second level of the hierarchy of scale levels and a second x-axis scale label of the second level of the hierarchy of scale levels, and wherein the first and second scale labels of the second level of the hierarchy are rotated, further comprising:
reducing, by the GUI, a second distance between the first and second x-axis scale labels of the second level of the hierarchy of scale levels, responsive to detecting a second command that re-renders the chart in a smaller display area;
determining, by the GUI, that the second distance is within a distance threshold;
increasing, by the GUI, the determined second distance beyond the distance threshold.

7. The method of claim 1, wherein the chart includes a plurality of horizontal gridlines that correspond to a plurality of y-axis scale labels, wherein the y-axis scale labels indicate a scale of a y-axis of the line chart, further comprising:
reducing, by the GUI, a second distance between adjacent horizontal gridlines from the plurality of horizontal gridlines, responsive to detecting a second command that re-renders the chart and that reduces the second distance between adjacent horizontal gridlines;
determining, by the GUI, that the second distance is within a distance threshold;
increasing, by the GUI, the determined second distance beyond the distance threshold by omitting every other horizontal gridline, from the plurality of horizontal gridlines, from being displayed; and
displaying, by the GUI, within the chart re-rendered according to the second command, the set of data and the horizontal gridlines that were not omitted.

8. The method of claim 7, wherein the second command reduces a height of the display area or zooms out of the chart.

9. A system, comprising:
a memory; and
at least one processor coupled to the memory and configured to:
generate, by a graphical user interface (GUI) implemented via the at least one processor, a chart to render a set of data for display within a display area of the display device, wherein the display area includes a first x-axis scale label of a first level of a hierarchy of scale levels and a second x-axis scale label of the first level of the hierarchy of scale levels, and at least one x-axis scale label of a second level of the hierarchy of scale levels, wherein the first level of the hierarchy of scale levels is more granular than the second level of the hierarchy of scale levels;
reduce, by the GUI, a distance between the first and second x-axis scale labels to a reduced distance, responsive to detecting a first command to re-render the chart;
automatically rotate, by the GUI, the first x-axis scale label towards a vertical orientation, responsive to a determination that the reduced distance is within a first threshold;
display, by the GUI, the set of data and the at least one rotated first or second x-axis scale labels within the chart as re-rendered according to the first command; and
automatically re-render, by the GUI, the chart to display the set of data and the at least one x-axis scale label of the second level of the hierarchy of scale levels, omitting the first level of the hierarchy of scale levels, responsive to a determination that the display area is reduced in size within a second threshold.

10. The system of claim 9, wherein the first command reduces a width of the display area or zooms out of the chart.

11. The system of claim 9, wherein a font size of the given x-axis scale label remains the same throughout the generating, reducing, rotating, and displaying.

12. The system of claim 9, wherein the at least one x-axis scale label of the second level of the hierarchy of scale levels comprises a first x-axis scale label of the second level of the hierarchy of scale levels and a second x-axis scale label of the second level of the hierarchy of scale levels, and wherein the first and second scale labels of the second level of the hierarchy are rotated, wherein the at least one processor is further configured to:
reduce, by the GUI, a second distance between the first and second x-axis scale labels of the second level of the hierarchy of scale levels, responsive to detecting a second command that re-renders the chart in a smaller display area
determine, by the GUI, that the second distance is within a distance threshold;

increase, by the GUI, the determined second distance beyond the distance threshold.

13. The method of claim 9, wherein the chart includes a plurality of horizontal gridlines that correspond to a plurality of y-axis scale labels, wherein the y-axis scale labels indicate a scale of a y-axis of the line chart, and wherein the at least one processor is further configured to: reduce, by the GUI, a second distance between adjacent horizontal gridlines from the plurality of horizontal gridlines, responsive to detecting a second command that re-renders the chart and that reduces the second distance between adjacent horizontal gridlines;
- determine, by the GUI, that the second distance is within a distance threshold;
- increase, by the GUI, the determined second distance beyond the distance threshold by omitting every other horizontal gridline, from the plurality of horizontal gridlines, from being displayed; and
- display, by the GUI, within the chart re-rendered according to the second command, the set of data and the horizontal gridlines that were not omitted.

14. The system of claim 13, wherein the second command reduces a height of the display area or zooms out of the chart.

15. A non-transitory computer-readable device having instructions stored thereon that, when executed by at least one computing device, cause the at least one computing device to perform operations comprising:
- generating, by a graphical user interface (GUI) implemented on a display device, a chart to render a set of data for display within a display area of the display device, wherein the display area includes first x-axis scale label of a first level of a hierarchy of scale levels and a second x-axis scale label of the first level of the hierarchy of scale levels, and at least one x-axis scale label of a second level of the hierarchy of scale levels, wherein the first level of the hierarchy of scale levels is more granular than the second level of the hierarchy of scale levels;
- reducing, by the GUI, a distance between the first and second x-axis scale labels to a reduced distance responsive to detecting a first command to re-render the chart;
- automatically rotating, by the GUI, the first x-axis scale label towards a vertical orientation, responsive to a determination that the reduced distance is within a first threshold;
- displaying, by the GUI, the set of data and at least one rotated first or second x-axis scale label within the chart as re-rendered according to the first command; and
- automatically re-rendering, by the GUI, the chart to display the set of data and the at least one x-axis scale label of the second level of the hierarchy of scale levels, omitting the first level of the hierarchy of scale levels, responsive to a determination that the display area is reduced in size within a second threshold.

16. The computer-readable device of claim 15, wherein a font size of the given x-axis scale label remains the same throughout the generating, reducing, rotating, and displaying.

17. The computer-readable device of claim 15, wherein the chart includes a plurality of horizontal gridlines that correspond to a plurality of y-axis scale labels, wherein the y-axis scale labels indicate a scale of a y-axis of the line chart, and wherein the at least one processor is further configured to:
- reduce, by the GUI, a second distance between adjacent horizontal gridlines from the plurality of horizontal gridlines, responsive to detecting a second command that re-renders the chart and that reduces the second distance between adjacent horizontal gridlines;
- determine, by the GUI, that the second distance is within a distance threshold;
- increase, by the GUI, the determined second distance beyond the distance threshold by omitting every other horizontal gridline, from the plurality of horizontal gridlines, from being displayed; and
- display, by the GUI, within the chart re-rendered according to the second command, the set of data and the horizontal gridlines that were not omitted.

18. The computer-readable device of claim 15, wherein the first command reduces a width of the display area or zooms out of the chart.

19. The computer-readable device of claim 15, the operations further comprising:
- presenting, within the chart, the set of data as selectable data points;
- responsive to receiving a selection of one of the selectable data points, determining an x-axis value and a y-axis value that correspond to the selection; and
- displaying a GUI element on top of the line chart that shows the determined x-axis and y-axis scale labels.

20. The system of claim 9, wherein the at least one processor is further configured to:
- present, within the chart, the set of data as selectable data points;
- responsive to receiving a selection of one of the selectable data points, determine an x-axis value and a y-axis value that correspond to the selection; and
- display a GUI element on top of the line chart that shows the determined x-axis and y-axis scale labels.

* * * * *

UNITED STATES PATENT AND TRADEMARK OFFICE
CERTIFICATE OF CORRECTION

PATENT NO. : 10,275,911 B2
APPLICATION NO. : 15/198874
DATED : April 30, 2019
INVENTOR(S) : Kim et al.

It is certified that error appears in the above-identified patent and that said Letters Patent is hereby corrected as shown below:

In the Claims

Claim 4, Column 15, Line 23, "on top of the line chart" should read --on top of the chart--;

Claim 6, Column 15, Line 50, "second scale labels" should read --second x-axis scale labels--;

Claim 7, Column 15, Line 64, "y-axis of the line chart" should read --y-axis of the chart--;

Claim 9, Column 16, Line 22, "of the display device" should read --of a display device--;

Claim 11, Column 16, Line 50, "size of the given" should read --size of a given--;

Claim 12, Column 16, Line 58, "second scale labels" should read --second x-axis scale labels--;

Claim 12, Column 16, Line 67, "a distance threshold;" should read --a distance threshold; and--;

Claim 13, Column 17, Line 3, "The method of claim 9" should read --The system of claim 9--;

Claim 13, Column 17, Line 6, "y-axis of the line chart" should read --y-axis of the chart--;

Claim 15, Column 17, Line 32, "includes first x-axis" should read --includes a first x-axis--;

Claim 15, Column 17, Line 47, "data and at least one" should read --data and the at least one--;

Claim 16, Column 18, Line 5, "font size of the given" should read --font size of a given--;

Claim 17, Column 18, Lines 11-12, "y-axis of the line chart" should read --y-axis of the chart--;

Claim 17, Column 18, Line 14, "reduce," should read --reducing,--;

Signed and Sealed this
Fifth Day of May, 2020

Andrei Iancu
*Director of the United States Patent and Trademark Office*

CERTIFICATE OF CORRECTION (continued)
U.S. Pat. No. 10,275,911 B2

Claim 17, Column 18, Line 19, "determine," should read --determining,--;

Claim 17, Column 18, Line 21, "increase," should read --increasing,--;

Claim 17, Column 18, Line 25, "display," should read --displaying,--;

Claim 19, Column 18, Line 40, "top of the line chart" should read --top of the chart--; and Claim 20, Column 18, Line 49, "top of the line chart" should read --top of the chart--.